United States Patent [19]

Hamilton

[11] Patent Number: 5,150,808
[45] Date of Patent: Sep. 29, 1992

[54] CAP HOLDER DEVICE

[76] Inventor: Tyrone Hamilton, 5234 Stuyvesant, Houston, Tex. 77021

[21] Appl. No.: 602,862

[22] Filed: Oct. 24, 1990

[51] Int. Cl.⁵ .............................................. B65D 55/16
[52] U.S. Cl. .................................. 220/375; 220/255; 220/256; 220/483; 220/DIG. 19; 220/DIG. 33
[58] Field of Search .............. 220/DIG. 33, 86.2, 375, 220/255, 256, 305, 376, 379, 85 CH, 85 D, DIG. 19, 483, 724, 737; 215/306; 224/273, 42.45 R; 296/97.22

[56] References Cited

U.S. PATENT DOCUMENTS

| | | | |
|---|---|---|---|
| 1,408,082 | 2/1922 | Dowler | 220/375 |
| 1,924,242 | 8/1933 | Kaye | 215/306 |
| 2,009,721 | 7/1935 | Williams | 224/309 |
| 2,890,852 | 6/1959 | Bradley | 224/309 X |
| 4,320,853 | 3/1982 | Moore | 220/DIG. 33 X |
| 4,705,190 | 11/1987 | Mizusawa | 220/375 |
| 4,811,765 | 3/1989 | Giha | 220/DIG. 33 X |

FOREIGN PATENT DOCUMENTS 581507  9/1958  Italy ..................................... 215/306

Primary Examiner—Stephen Marcus
Assistant Examiner—Paul A. Schwarz
Attorney, Agent, or Firm—Kenyon & Kenyon

[57] ABSTRACT

A novel device that can be placed on a car gas cap to connect the cap to the car so that one cannot lose the cap due to forgetfulness or such. The device consists of an elastic body which can be stretched over the cap to allow for added friction grip to enable someone to remove or tighten the cap, and a connector strap assembly consisting of a flexible strap with a means of attachment to the car body. A suction cup is placed on the opposite side of the elastic body from the opening for the cap. This allows the user to attach the cap back out of his way while filling his gas inlet by merely pulling the cap back with the elastic body covering it and sticking out of his way conveniently and easily. Various sizes and shapes of car gas caps can be allowed for by the elastic nature of the device, however to give the best fit it is contemplated that several sizes will be available.

20 Claims, 4 Drawing Sheets

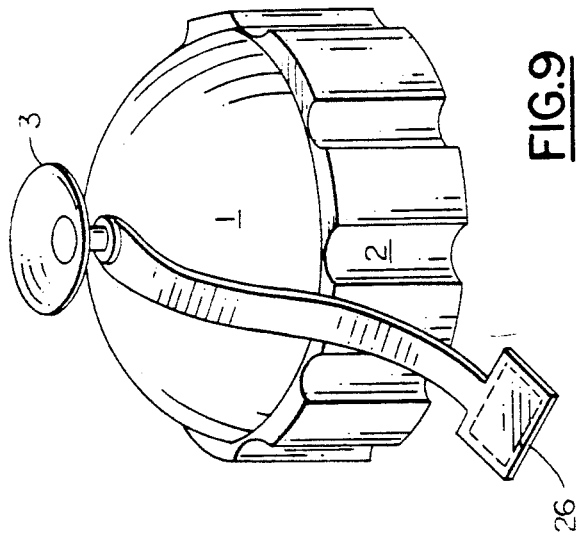
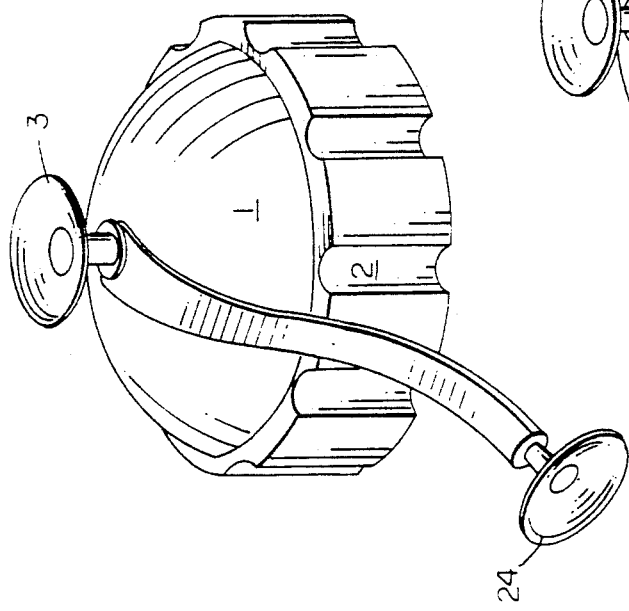
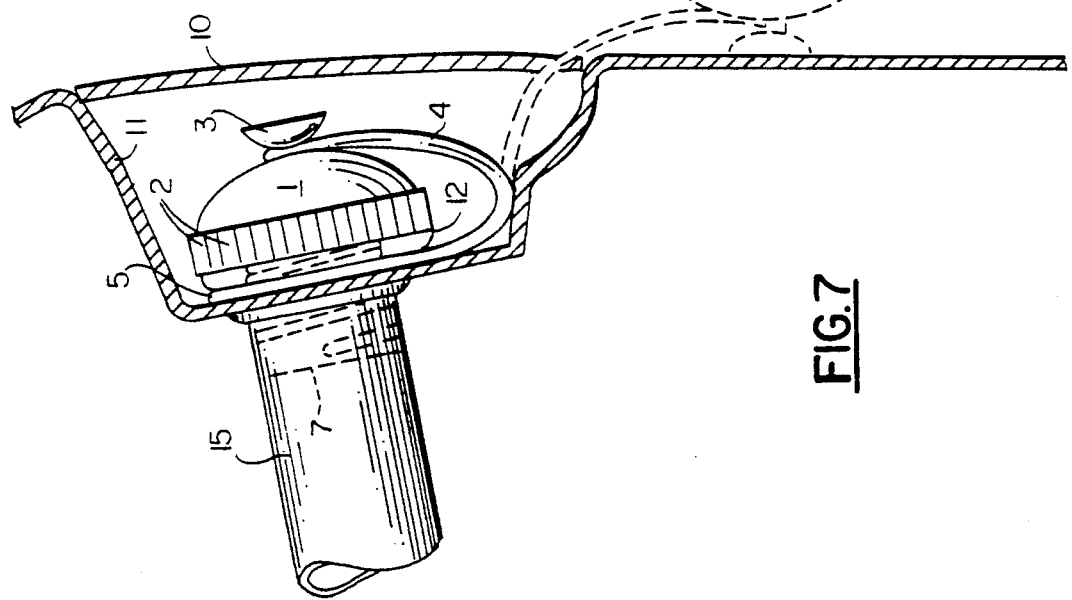

CAP HOLDER DEVICE

BACKGROUND OF THE INVENTION

This invention relates to a device for holding an automobile fuel-tank filler port cap by connection to the automobile body.

The fuel-tank filler port of an automobile usually opens inside a recess formed by recessing the automobile body surface. The recess is covered by a lid which can be lockable.

The covering of the filler port with the lid is mainly for thwarting thieves and ensuring safety. Since the filler port cap is covered by the lid, it is usually made to be removable after the lid has been opened.

One problem with filler caps is the difficulty of opening them especially after the fuel inside has gasified and pressured the cap sealing the tank. A person unable to apply adequate arm strength such as a handicapped person or someone limited at the moment due to holding another object can struggle to remove the filler cap.

The cap closing the automobile fuel-tank filler port is protected by the lid so that it will not be lost if it should come off while the lid is closed. Sometimes, however, a gasoline station attendant or the vehicle operator, after opening the lid and removing the filler cap, forgets to replace the cap after fueling up. In either case, the fuel is left to gasify, thus leading to a dangerous situation.

Particularly, if a station attendant should fail to replace and tighten the filler cap after fuel has been supplied, the driver is liable to continue driving for a long time without knowing this and hence an extremely dangerous situation arises.

In a truck having a fuel-tank mounted in an exposed state, the cap is held connected by a chain or the like to the filler port in order to avoid its loss. In the case of an automobile having a lid for covering the filler port, however, such a chain or other connecting member would obstruct the operator from opening and closing the lid because the chain would hang down. Particularly, since the filler port is often provided on an upright side surface of the automobile body, such inconvenience would be encountered. Therefore, it becomes very cumbersome to manipulate the hanging connecting member, and the lid is liable to be damaged when the lid is imperfectly closed due to the presence of the connecting member or when excessive force is applied to the lid in the imperfectly closed state.

Another problem of the chain or like mechanism is that the cap can bang or nick the body of the vehicle. This is not such a problem with a truck made for heavy duty service but with a more appearance oriented vehicle like a car the damage done by the cap dangling presents a serious problem.

In addition to the closure problems of such a chain or like mechanism there is the added problem of the many different styles and sizes of filler caps, filler ports and lids. A multitude of sizes and styles of chain or like mechanisms would have to be provided to give a good fit.

The novel, new invention of this disclosure provides a way for attachment of the filler cap to the vehicle when opening the filler port that is convenient and additionally keeps the filler cap in view for replacement preventing loss.

The nonobvious device of this invention can be quickly and easily fitted to a filler cap on a vehicle so that the cap is secured to the vehicle while filling the tank, preventing loss, and additionally can add a cover to the cap which will give increased gripping power to open the cap and protection against banging or nicking the body of the vehicle with the cap.

The new device of this disclosure is made of flexible materials so that a number of sizes and styles of filler caps can be accomodated. The device can even be formed into familiar shapes such as a football, baseball, basketball, golfball, or other recognizable shapes. In addition, advertising can be utilized on the outside of the device for increased utility.

SUMMARY OF THE INVENTION

One object of the invention is to provide a device for holding an automobile fuel-tank filler port cap, which is capable of being accommodated in a small space and is easy to handle.

Another object of the invention is to provide a device for holding an automobile fuel-tank filler port cap, which is capable of reliably holding the cap removed from the filler port without causing the removed cap to mar or scratch the automobile body surface.

Another object of this invention is to provide a flexible device that is easily adaptable to many different styles and sizes of filler caps, filler ports and lids.

A further object of this invention is to provide a cover for filler caps that will give increased gripping power to remove the cap from the filler port.

A still further object of this invention is to provide a decorative cover for a filler cap that is both aesthetic to the sight and can be used for a surface to imprint advertising, logos, or the like. Additionally, the filler cap cover made be made into recognizable shapes such as a football, basketball, baseball, golfball, or other attractive shapes.

Another object of the invention of this disclosure is to provide a device for accomodating the filler cap of a vehicle and holding it nearby the filler port so that it is not lost or forgotten by the user, while also allowing the storage of the device within the space defined by the lid enclosing the filler port.

According to the invention, there is provided a device for holding an automobile fuel-tank filler port cap, which comprises an elastic body securable to a position near the filler port, a ring-like holding member rotatably fitted around the filler port, and a connecting member connecting the body and holding members, the connecting member being extended into a strip-like form when the cap is removed.

With the device according to this invention, when fitting the cap on the filler port and closing the same, the connecting member is folded and the device is thus accommodated in the folded state to permit a lid covering the filler port to be closed smoothly. The cap thus remains attached to the car body at all times, such that loss thereof is prevented. Since the removed cap suspended by the device is most conspicuous, the chances of someone forgetting to replace the cap are very small.

This invention is a novel device that can be placed on your car gas cap and it allows you to connect the cap to the car so that one cannot lose the cap due to forgetfulness or such.

The new, nonobvious device of this invention consists of an elastic body which can be stretched over the existing gas tank cap and a connector strap assembly which allows the cap to be fixed to the body of the car.

The elastic body stretched over the cap allows for added friction grip to enable someone to better remove or tighten the cap.

The connector strap assembly consists of a flexible strap and a means of attachment to the car body. One embodiment is a circle formed in one end of the flexible strap sized to slip over the mouth of the filler port and at the opposite end of the flexible strap is attached the elastic body. Another embodiment provides a clamp at the end of the strap instead of the circle, which can attach directly to the car or the lid of the gas cap area if the car has one. Another embodiment utilizes a suction cup instead of the clamp and the suction cup can be used to attach the flexible strap to the car.

A further feature of the elastic body is a suction cup placed on the opposite side of the elastic body from the opening for the cap. This allows the user to attach the cap back out of his way while filling his gas inlet. By merely pulling the cap back with the elastic body covering it and sticking the suction cup to the car or gas cap area door one has placed the cap out of his way conveniently and easily, yet the cap is still visible to remind the user to replace it.

The various sizes and shapes of car gas caps can be allowed for by the elastic nature of the device, however, to give the best fit it is contemplated that several sizes will be available. The elastic body which covers the filler cap can be made into recognizable shapes such as a football, baseball, basketball, golfball, or other attractive shapes. The surface of the elastic body is visible to the user and therefore can be utilized for advertising or decorative designs. The surface of the connecting strap can also be used for advertising or decorative designs.

The above and other objects and features of the invention will become more apparent from the following detailed description with reference to the accompanying drawings.

IN THE DRAWINGS

FIG. 7 is a side view, partly in section, showing the holding device of this invention in place on a vehicle with the filler cap closed and the holding device folded for storage within the vehicle lid enclosure.

FIG. 8 is a perspective view showing an alternative embodiment of the holding device according to the invention.

FIG. 9 is a perspective view showing an alternative embodiment of the holding device according to the invention.

DETAILED DESCRIPTION

Figure 1:
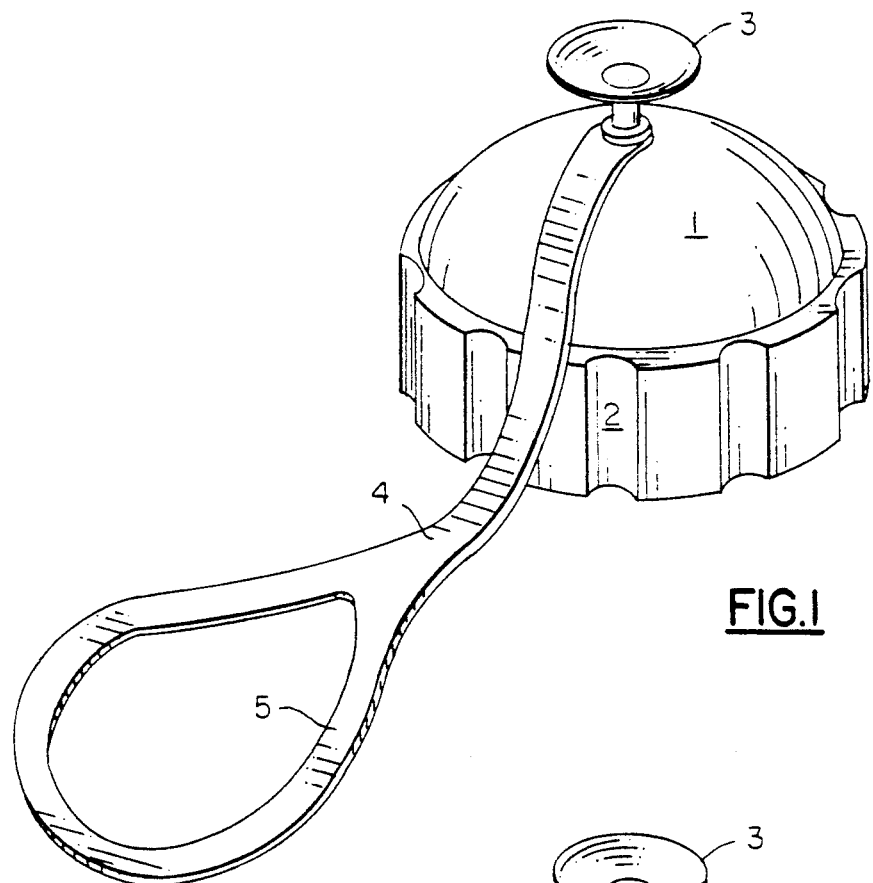
FIG. 1 is a perspective view showing a first embodiment of the holding device according to the invention.

FIG. 1 illustrates an embodiment of the device for holding a fuel-tank filler cap according to this invention. More specifically, FIG. 1 is a perspective view showing a first embodiment of the holding device according to the invention.

Referring to FIG. 1, reference numeral 1 designates the flexible body of the fuel-tank filler cap holder according to the disclosure of this invention. The cap holder flexible body 1, has a ring of a plurality of indentations 2, around its widest circumference to increase the gripping power a user has to open the filler cap of a vehicle. The flexible body 1, with indentations 2, can be composed of rubber or synthetic plastics which provide a certain amount of elasticity while also giving some degree of surface friction to the touch of a user to enable increased gripping power to open the filler cap of a vehicle. The elasticity of the flexible body 1, allows the expansion of the device to enclose the filler cap of a vehicle followed by the contraction of the device to hold the filler cap tight. This elasticity allows for one size of the flexible body 1, to fit many available filler cap styles and sizes.

The flexible body has an optimum size of two inches to four inches in diameter when it is formed as a hollow sphere which works best on most filler caps. Other configurations of the flexible body are possible such as a half sphere or oval. On one side of the flexible body is provided a circular opening of from one inch to three inches in diameter to allow the filler cap to enter the flexible body. The plurality of indentations provides a means for gripping the flexible body with the filler cap inside. These indentations work the best when each indentation is in a range from one fourth inch to one inch wide.

A suction cup 3, is attached to the top of the flexible body 1, opposite the opening in the flexible body in order to provide means for attaching the filler cap of a vehicle back out of the way of the filler port of a vehicle when performing fueling of the vehicle. This is accomplished by fitting the flexible body 1, of this invention upon the filler cap and then attaching the suction cup 3, to the body of the vehicle in a desired location.

A flexible, foldable connector strap assembly 4, is provided to connect the flexible body 1, to the vehicle filler port. This connector strap assembly 4, can be a round or flat strap easily foldable and composed of an elastic material such as rubber or plastic to enhance flexibility as well as durability and long life. If round the strap is ideally one fourth inch to two inches in diameter and from three inches to twelve inches in length. If flat the strap is ideally from one fourth inch to two inches wide, one thirty second inch to one fourth inch thick, and from three inches to twelve inches long. The connector strap assembly 4, is attached to the flexible body 1, at one end and attaches to the vehicle filler port at its other end.

One means of attachment of the connector strap assembly to the vehicle filler port is shown in FIG. 1 as a circle 5, formed in the end of the connector strap assembly 4. This circle 5, is composed of the same flexible material as the connector strap assembly 4, and therefore is capable of expansion and contraction around the vehicle filler port to enable the connector strap assembly 4, to be attached to the vehicle. Ideally the inner diameter of this circle is from one inch to five inches to accomodate filler caps of today's vehicles.

An alternative embodiment of the attachment of the connector strap assembly to the vehicle is a clamp 26, as shown in FIG. 9, that would attach to either the filler port or to the body of a vehicle, while attaching to the end of the connector strap assembly 4, where the circle 5, is shown in FIG. 1. Another alternative embodiment of the attachment means is a suction cup 24, as shown in FIG. 8, attaching to the connector strap assembly where the circle 5, is shown in FIG. 1 and then attaching to the vehicle in a desired location to connect the flexible body 1, to the vehicle.

Figure 2:
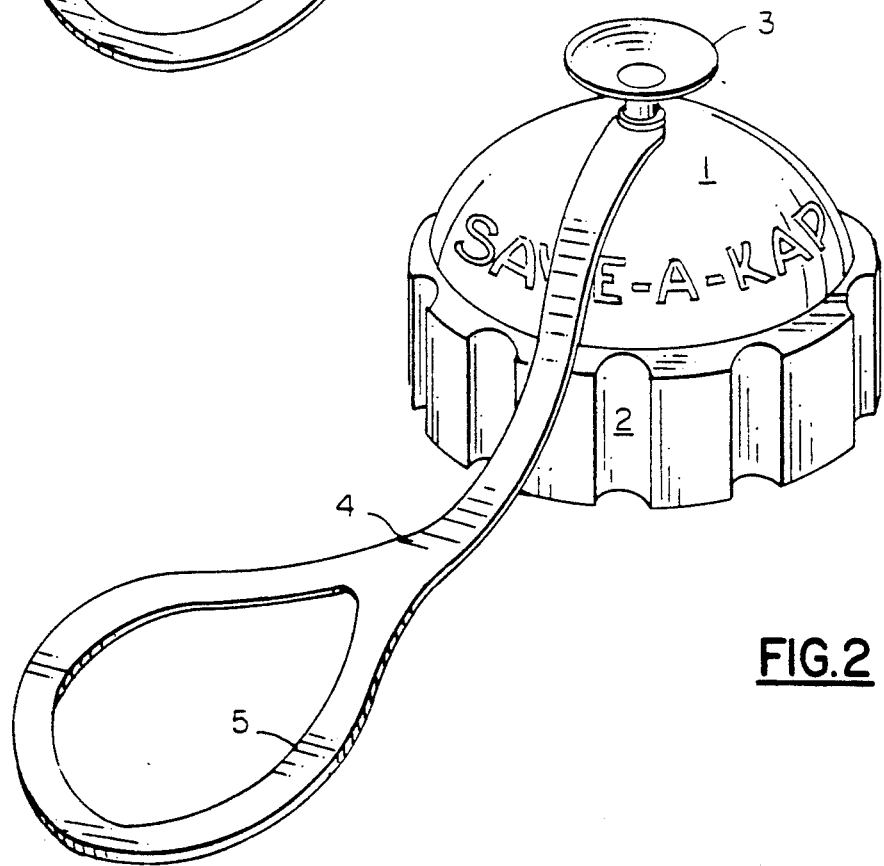
FIG. 2 is a perspective view showing a first embodiment of the holding device according to the invention with advertising imprinted upon the surface of the holder.

FIG. 2 is a perspective view showing a first embodiment of the holding device according to the invention with advertising imprinted upon the surface of the holder. A special rubber or plastic material can be used to form the flexible body of the holder in order to allow printing upon its surface. Such a material can be used to form the connector strap assembly and thereby allowing for printing upon it also.

FIG. 2 discloses the possible use of the novel, new invention of this disclosure in the advertising or printing arts. The surface of the flexible body 1, is used to display printing which can be for advertising purposes. Since the flexible body 1, is composed of rubber or plastic the surface can be used for printing in its natural state or various coatings can be applied to improve the quality of printing surface or to produce special effects. Another embodiment of this device would be one in which the connector strap assembly is also utilized on its surfaces for printing.

Figure 3A:
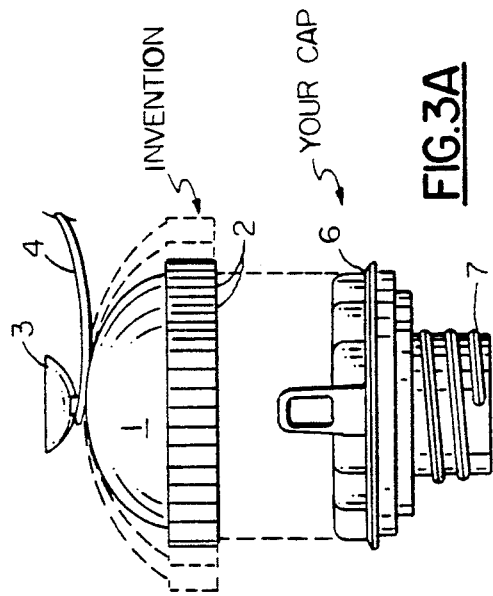
FIG. 3A is a side view, partly in section, showing the holding device of FIG. 1 being placed upon a filler cap.

FIG. 3A is a side view, partly in section, showing the holding device of FIG. 1 being placed upon a filler cap top 6, of a vehicle filler cap 7. The flexible body 1, of the holding device of this invention is shown as it expands and contracts to enclose the filler cap top 6, of the filler cap 7. A circular opening is provided on the under side of the flexible body 1, to receive the filler cap 7. The ring of indentations 2, is positioned on the widest circumference of the flexible body 1, so that when in place on the filler cap top 6, it can provide an increased gripping power to the user. The suction cup 3, and connector strap assembly 4, are shown in place on the flexible body 1.

Figure 3B:
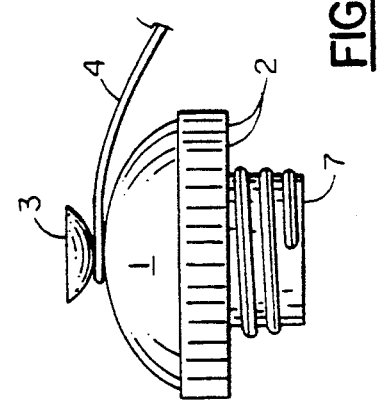
FIG. 3B is a side view, partly in section, showing the holding device of FIG. 1 placed upon a filler cap.

FIG. 3B is a side view, partly in section, showing the holding device of FIG. 1 placed upon a filler cap 7. The flexible body 1, is shown on the filler cap 7, with the ring of indentations 2, the suction cup 3, and the connector strap assembly 4, in place on the flexible body 1.

Figure 4:
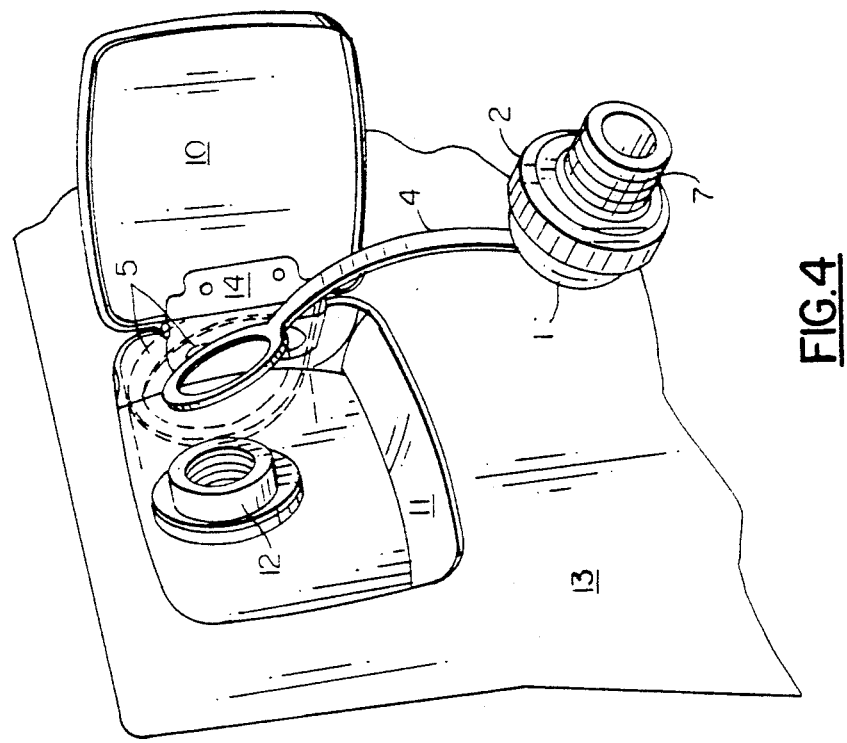
FIG. 4 is a perspective view showing the holding device placed upon a filler cap and about to be fitted on the filler port to complete the installation.

FIG. 4 is a perspective view showing the holding device placed upon a filler cap 7, and about to be fitted on the filler port 12, to complete the installation.

A vehicle body 13, is shown in section in FIG. 4. A recessed enclosure 11, in the vehicle body 13, is covered by door 10, attached to the vehicle body 13, by hinge 14. This recessed enclosure 11, provides a place for the vehicle filler port 12, which is shown with filler cap 7, removed. The flexible body 1, is shown enclosing the filler cap 7. The circle 5, formed in the end of the connector strap assembly 4, is shown expanding and contracting in order to attach around the vehicle filler port 12, and thus connect the flexible body 1, to the vehicle.

Figure 5:
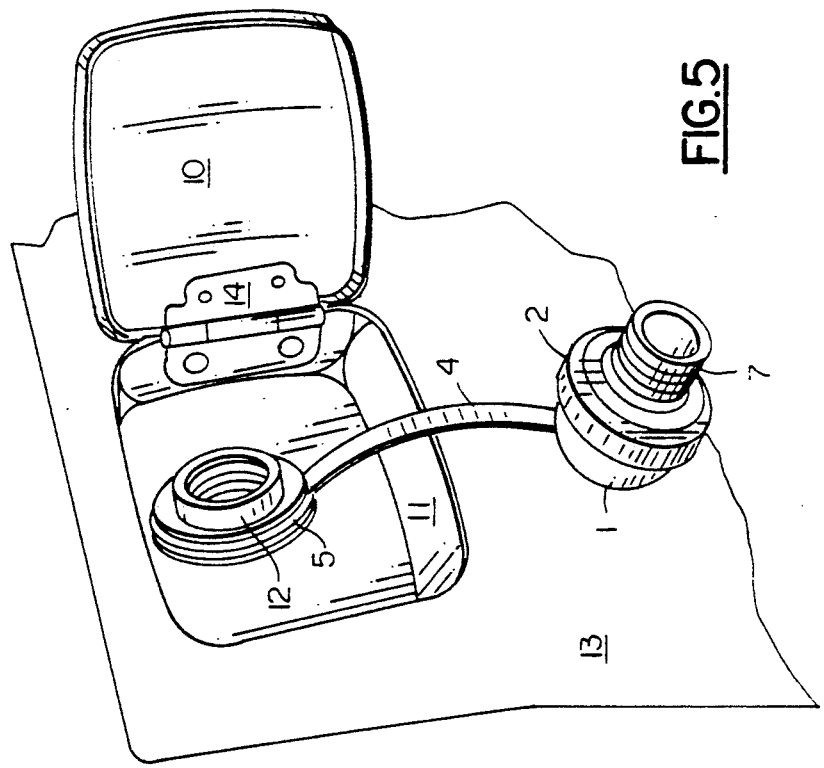
FIG. 5 is a perspective view showing the holding device placed upon a filler cap and fitted on the filler port to complete the installation.

FIG. 5 is a perspective view showing the holding device placed upon a filler cap 7, and fitted on the filler port 12, to complete the installation.

Figure 6:
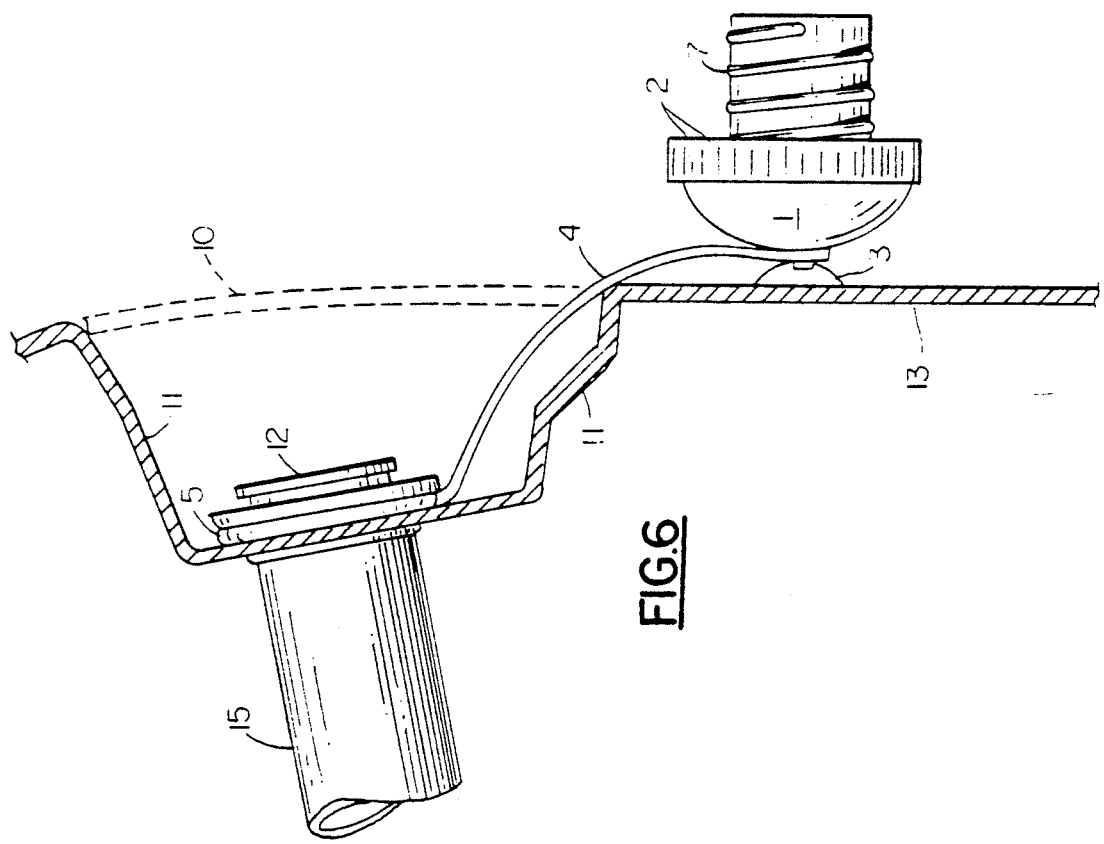
FIG. 6 is a side view, partly in section, showing the holding device of this invention in place on a vehicle with the filler cap removed and attached by suction cup to the body of the vehicle.

FIG. 6 is a side view, partly in section, showing the holding device of this invention in place on a vehicle with the filler cap 7, removed and attached by suction cup 3, to the body of the vehicle 13.

The flexible body 1, encloses the filler cap 7, and by means of the connector strap assembly 4, attaches to the filler port 12. The filler port 12, is shown in a recess 11, in the vehicle body 13, and covered by door 10, shown removed for simplicity. The filler port 12, leads to the fuel inlet 15. When the fueling operation normally takes place, filler cap 7, is removed from filler port 12, and therein lies the problem that this novel, new invention solves. Instead of a user laying the filler cap 7, aside to lose or forget, the user can utilize the invention of this disclosure. By enclosing the filler cap 7, in the flexible body 1, of this invention, and then attaching the connector strap assembly 4, to the filler port 12, by means of circle 5, in the end of the connector strap assembly 4, as shown in FIG. 6 or by alternative embodiments of this invention such as by clamp or suction cup the user can supply his vehicle with a means to hold the filler cap 7, during fueling without loss or misplacement.

The suction cup 3, will allow the user to position the filler cap in a desired location on the vehicle body 13, that is convenient and prevents the loss of the filler cap 7. The user can just allow the filler cap 7, to dangle at the end of the connector strap assembly just as he desires.

FIG. 7 is a side view, partly in section, showing the holding device of this invention in place on a vehicle with the filler cap 7, closed and the holding device folded for storage within the vehicle lid enclosure 11.

The filler cap 7, is enclosed in the flexible body 1, and is mounted on the filler port 12, closing off the fuel inlet 15. The connector strap assembly 4, is shown in folded configuration and is stored with the recess 11, containing the filler port 12. The door 10, closes off the recess 11. The suction cup 3, is shown unattached to the vehicle. The ring of indentations 2, is shown at the widest circumference of the flexible body 1, thus enabling increased gripping for opening by the user. The dashed outline in FIG. 7 reveals where the opened filler cap 7, could be placed by the holding device of this invention when the filler port 12 is opened for fueling.

While only particular embodiments of the present invention and modes of practicing the invention have been shown and described, it is apparent that changes and modifications may be made without departing from this invention in its broader aspects, therefore the aim in the appended claims is to cover all such changes and modifications as fall within the true spirit and scope of this invention.

What is claimed is:

1. An apparatus for holding a vehicle filler cap comprising:

A. a flexible body with an opening to receive a filler cap;

B. a connector strap assembly that is foldable and attached to said flexible body;

C. means for attaching said connector strap assembly to the vehicle body; and

D. a suction cup to mount said flexible body.

2. The apparatus of claim 1 wherein said attaching means comprise a circle formed in one end of said connector strap assembly, wherein said connector strap assembly is formed of flexible material, and wherein said flexible body is mounted at the other end of said connector strap assembly.

3. The apparatus of claim 2 wherein said flexible material is rubber and said connector strap assembly includes a flat strap from one fourth inch to two inches wide and from one thirtysecond inch to one fourth inch thick and from three inches to twelve inches long.

4. The apparatus of claim 2 wherein said circle has an inner diameter of from one inch to five inches.

5. The apparatus of claim 1 wherein said attaching means comprise a clamp mounted at one end of said connector strap assembly, wherein said connector strap assembly is formed of flexible material, and wherein said flexible body is mounted at the other end of said connector strap assembly.

6. The apparatus of claim 1 wherein said attaching means comprise a suction cup mounted at one end of said connector strap assembly, wherein said connector strap assembly is formed of flexible material, and wherein said flexible body is mounted at the other end of said connector strap assembly.

7. The apparatus of claim 1 wherein said flexible body is composed of a rubber or plastic which is capable of receiving printing upon its surface and has a plurality of indentations in a ring around its largest circumference, each indentation being from one fourth inch to one inch wide.

8. The apparatus of claim 1 wherein said Flexible body is a hollow half sphere of a diameter from two inches to four inches and has said opening which is circular with diameter from one inch to three inches.

9. The apparatus of claim 1 wherein said connector strap assembly includes a round strap connecting said attaching means and said flexible body, wherein said round strap has a diameter from one fourth inch to two inches and length of from three inches to one foot.

10. An apparatus for holding a vehicle filler cap comprising:
   A. a flexible body with circular opening to receive a filler cap and a plurality of indentations on the outer surface at the largest circumference of said flexible body,
   B. a connector strap assembly that is foldable and attached to said flexible body;
   C. means for attaching said connector strap assembly to the vehicle body; and
   D. a suction cup to mount said flexible body.

11. The apparatus of claim 10 wherein said attaching means comprise a circle formed in one end of said connector strap assembly, wherein said connector strap assembly is formed of flexible material, and wherein said flexible body is mounted at the other end of said connector strap assembly.

12. The apparatus of claim 11 wherein said flexible material is rubber and said connector strap assembly defines a flat strap from one fourth inch to two inches wide and from one thirty-second inch to one fourth inch thick and from three inches to twelve inches long.

13. The apparatus of claim 11 wherein said circle has an inner diameter of from one inch to five inches.

14. The apparatus of claim 10 wherein said attaching means comprise a clamp mounted at one end of said connector strap assembly, wherein said connector strap assembly is formed of flexible material, wherein said flexible material is rubber, wherein said connector strap assembly defines a flat strap from one fourth inch to two inches wide and from one thirtysecond inch to one fourth inch thick and from three inches to twelve inches long, and wherein said flexible body is mounted at the other end of said connector strap assembly.

15. The apparatus of claim 10 wherein said attaching means comprise a suction cup mounted at one of said connector strap assembly, wherein said connector strap assembly is formed of flexible material, wherein said flexible material is rubber and said connector strap assembly defines a flat strap from one fourth inch to two inches wide and from one thirtysecond inch to one fourth inch thick and from three inches to twelve inches long, and wherein said flexible body is mounted at the other end of said connector strap assembly from said clamp.

16. The apparatus of claim 10 wherein said flexible body is composed of a rubber or plastic which is capable of receiving printing upon its surface and has a plurality of indentations in a ring around its largest circumference, each indentation being from one fourth inch to one inch wide.

17. The apparatus of claim 10 wherein said flexible body is a hollow half-sphere of a diameter from two inches to four inches and has said opening which is circular with diameter from one inch to three inches.

18. The apparatus of claim 10 wherein said connector strap assembly defines a round strap connecting said attaching means and said flexible body, wherein said round strap has a diameter from one fourth inch to two inches and length of from three inches to one foot.

19. the apparatus of claim 10 wherein said plurality of indentations are formed of rubber on a rim circling the widest circumference of said flexible body.

20. A device to hold a fuel filler cap of a vehicle when said cap is removed, comprising:
   A. a hollow, flexible body having a surface capable of receiving printing, and having a diameter from two inches to four inches and containing a circular opening of from one inch to three inches and a plurality of indentations in a ring around the widest circumference of said flexible body;
   B. a flexible, foldable connecting strap with a circle of an inner diameter from one inch to five inches formed in one end such that it is capable of encircling a vehicle filler port and fixed to said flexible body at the other end; and
   C. a suction cup mounted on the side of said flexible body opposite said circular opening.

* * * * *